Patented Oct. 21, 1952

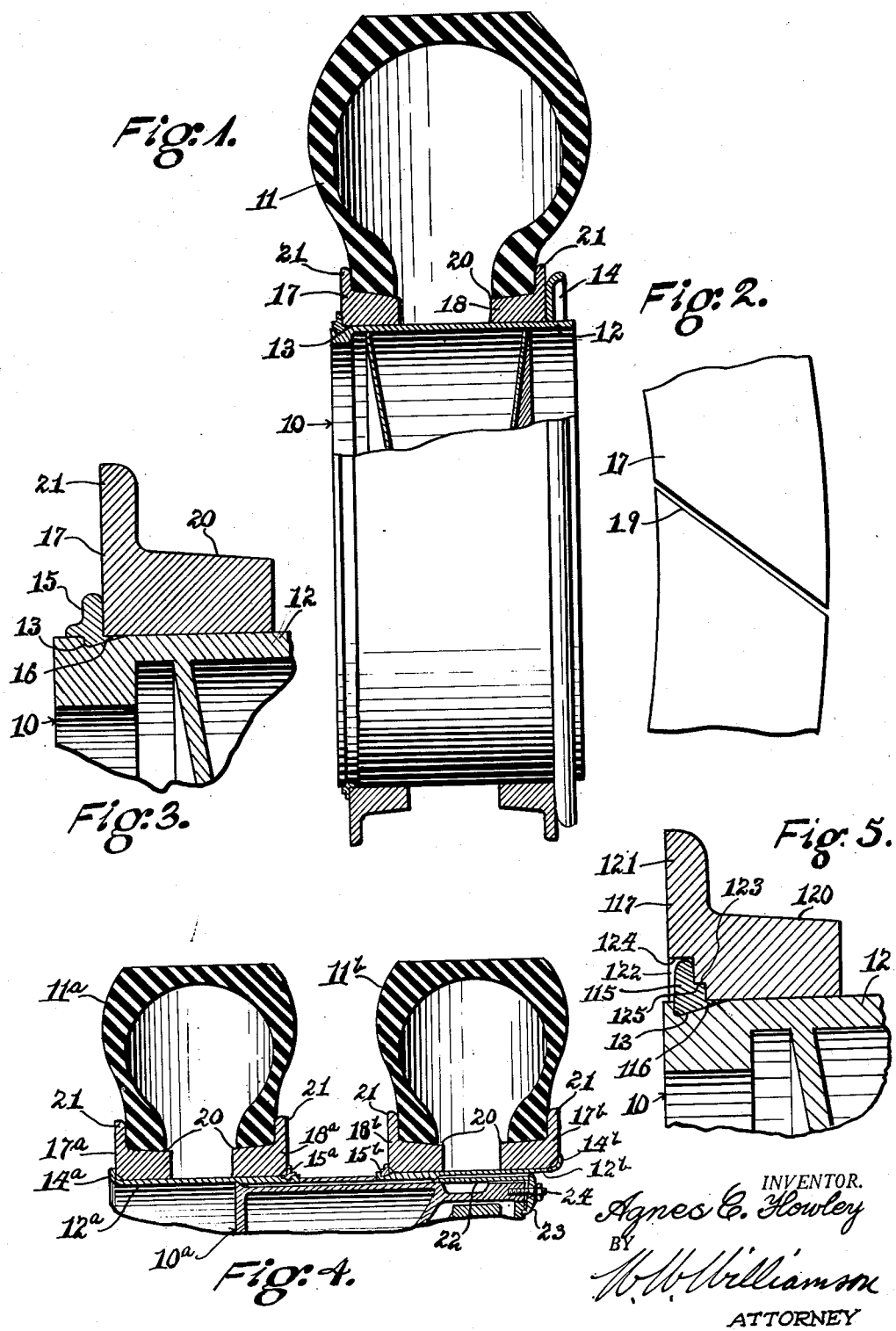

2,614,603

UNITED STATES PATENT OFFICE 2,614,603

ADAPTER FOR TRUCK WHEEL RIMS

Agnes C. Howley, Beverly Hills, Pa.

Application September 8, 1950, Serial No. 183,794

7 Claims. (Cl. 152—404)

My invention relates to new and useful adapters for truck wheel rims and one of the objects of this invention is to provide exceedingly simple, strong, durable and efficient means applicable to both permanent and demountable rims of vehicle wheels for increasing the diameter of a wheel rim periphery to accommodate a tire of larger diameter than that of the original wheel rim.

It is well known fact that airplane tires are especially advantageous for use on automotive trucks and vehicles utilized in hauling large loads because of the wide treads and expansive qualities which provide effective traction on various types of surfaces, particularly soft surfaces such as sand, loose shale and the like, over which vehicles have to travel. Heretofore it has been necessary to provide entirely new wheels to employ airplane tires and such wheels are exceedingly expensive and require considerable labor to substitute them for the original ones. Therefore another object of the present invention is to produce relatively inexpensive adapters for the customary rims of ordinary vehicle wheels fashioned to receive demountable pneumatic tires to step up the diameter of wheel so as to conform to the sizes of airplane or larger truck tires without the necessity of discarding the original wheels.

Another object of this invention is to produce vehicle wheel rim adapters of unique construction which are retained in place by the usual equipment employed for holding a tire on the rim, including the tire, particularly when under air pressure provided by the pneumatic inner tube.

A further object of the invention is to produce adapters of the class mentioned consisting of split rings to be employed in pairs for a single tire or shoe and each fashioned to provide an annular transversely inclined or tapered seat for a tire bead, and a radial stop flange along the outer edge of said seat, leaving the inner edge free of obstructions whereby a tire may be easily and readily slipped thereon.

A still further object of this invention is to produce adapters for vehicle wheel rims wherein one or both of a pair have an annular channel of novel formation along the corner ordinarily provided by the meeting of the inner circumference with the outer side wall, to house the split retaining ring and protect the latter against contact with outside obstructions.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing, forming a part hereof, in which:

Figure 1 is a broken elevation of a vehicle wheel, partly in section showing the adapters thereon and a portion of a tire or shoe, said adapters and tire portion illustrated in section to plainly depict the relation of the several elements to one another.

Fig. 2 is a fragmentary outer side elevation of one of the adapters to illustrate the split formation.

Fig. 3 is an enlarged fragmentary sectional view of the wheel and one adapter to illustrate details of construction.

Fig. 4 is a fragmentary sectional view of a conventional dual tire mounting and demountable rims utilizing the adapters.

Fig. 5 is a view similar to Fig. 3 showing a slightly modified form of adapter.

In carrying out the invention as herein embodied 10 represents any conventional type of vehicle wheel on which is mounted the conventional pneumatic tire 11, only the shoe being shown for purposes of illustration.

The wheel 10 includes a rim 12 which may be of the permanent type, as illustrated, or of the well known demountable type, one form of which is shown in Fig. 4, therefore whenever a rim is referred to herein it is to be understood that the term includes any type thereof wherein a retaining or locking ring is employed.

The conventional wheel rim used in connection with automotive trucks and other rather heavy duty vehicles is of cylindrical formation having a smooth periphery except for the usual annular groove 13 adjacent the outer edge of said rim and at the inner end or adjacent the inner edge thereof is located a fixed flange 14, Fig. 2.

Usually a tire of proper standard size is slipped onto the rim from the outer end thereof until one bead engages the flange 14 and then a split locking or retaining ring 15 is expanded and also slipped over the outer end of the rim until said locking or retaining ring registers with and snaps into the groove 13, due to contraction, for engagement with the other tire bead, to hold the tire in place on the rim.

Generally a locking or retaining ring, such as designated by the numeral 15, is provided with an annular lateral lip 16, Fig. 3, at the inner circumference thereof on which the tire rests so that when the latter is inflated said ring is held securely against accidental displacement. The above described structural and utilitarian features of the locking or retaining ring are taken advantage of in the present invention.

As one of the primary objects of this invention is to provide means whereby a tire of large diameter may be mounted on a wheel rim of somewhat smaller diameter there is illustrated, especially in Fig. 1, a pair of adapters 17 and 18 installed on the rim 12 and the tire 11 assembled on said adapters. Both adapters, although installed on opposite ends of the rim and in opposed relation, are exactly alike so that only one will be described in detail below.

Each adapter is an annulus, split at 19, Fig. 2, so that it may expand slightly and be contracted by an externally applied force. The interior diameter of the adapter is of a size to substantially fit the rim 12 while the outer circumference is fashioned to provide a transversely inclined or tapered tire seat 20 to substantially fit and receive the bead of a tire of large diameter relative to that of the rim. At the outer side edge or end of the adapter is a radially projecting flange 21 which functions as a stop for the respective tire bead seated on the adapter and the taper of the seat is such that the largest circumference thereof is contiguous to said flange 21.

By utilizing the customary wheel rim 12 of small size, whether permanent or demountable, and its locking or retaining ring 15, a tire of larger diameter than said wheel rim may be mounted thereon by employing a pair of adapters having an inside diameter substantially equal to the outside diameter of the rim and an outside diameter approximating the inside diameter of the tire thus compensating for the differences between the outside diameter of said rim and the inside diameter of the tire. Therefore, the adapters are to occupy the space which would remain between the tire and rim if the latter were placed inside of the former concentric therewith.

In practice, one adapter, as 18, of a pair can be placed on the wheel rim and caused to engage the flange 14, then the tire is mounted with one bead thereof resting on the seat of said one adapter and against the flange 21, next, the other adapter, as 17, is telescoped over the rim and within the companion bead of said tire so that said last mentioned bead rests on the seat of said second named adapter with its flange 21 in engagement with the outside of the tire bead. In assembling the second adapter of the pair between the rim and tire, said second adapter is pushed inwardly past the annular circumferential groove 13 and the locking or retaining ring 15 is expanded and slipped over the rim until said ring 15 registers with said groove 13 at which time said ring will contract and enter said groove. Finally, the tire, due to its inherent resiliency and/or the resulting pressure upon inflation, will repel the second adapter, as 17, until it engages the ring 15 and embraces the lip 16.

Inflating the tire causes it to expand to some extent and said tire will be forced to ride upon and snugly fit the inclined or tapered seats of the opposed adapters and hold the latter firmly against their stops composed of the flange 14 and retaining ring 15.

From the foregoing it will now be apparent that a tire of large diameter may readily be mounted on a rim of smaller diameter when adapters, such as described herein, of proper size are employed and all elements of the assembly will be securely but removably held in place, and by interchanging pairs of different sized adapters or eliminating them entirely tires of various sizes may be mounted on the same rim.

In Fig. 4 the same invention is illustrated as applied to a dual tire assembly wherein the rim section 12a is a permanent part of the wheel 10a and the rim section 12b is demountably held on the wheel by a flat band holding ring 22, the latter being fastened in place by the lugs 23 and bolts 24. No further detailed description of such a structure is deemed necessary since this is well known construction in many makes of vehicle wheels.

The permanent rim section 12a is provided with a flange 14a at the inner or far side of the wheel structure to position one of the pair of adapters, as unit 17a, identical in construction with those previously described and then the inner tire 11a is mounted, followed by the positioning of the other adapter unit, as 18a, which is fastened in place by the locking or retaining ring 15a set in an annular circumferential groove, similar to the groove 13, located intermediate the ends or sides of the complete wheel structure. The foregoing operations are accomplished with the demountable rim section 12b removed from the wheel.

While the rim section 12b is separated from the balance of the wheel structure, an adapter unit, as 17b is placed on said rim and disposed against the flange 14b, then the tire 11b is mounted, followed by the positioning of the other adapter unit, as 18b, which is fastened in place by the locking or retaining ring 15b set in an annular circumferential groove, identical with those previously described, located adjacent what is the inner edge of the demountable rim section 12b when assembled on the wheel. With both large tires mounted on their respective rim sections of smaller diameter, through the employment of the sets of adapters, said demountable rim section is connected to the wheel structure in the usual manner.

The modified form of adapter 117 illustrated in Fig. 5 is similar to those hereinbefore described in that it is a split annulus and has a tapered or inclined seat 120 extending from the outwardly projecting radial flange 121 located at the outer side or end of the annulus. The modification consists of providing an annular channel 122 in the outer end face of the annulus at the inner circumference thereof. The walls of said channel 122 are fashioned to provide inner and outer homocentric annular shoulders 123 and 124, respectively.

A split locking or retaining ring 115 which, like the previously described one, sets in the groove 13 is, preferably, of less width than the transverse depth of the channel so as to be housed therein when the adapter is reversely slid thereover. The inner side face of said ring 115 is fashioned to provide an annular offset step 125 which coacts with the inner shoulder 123 while the perimeter of said ring cooperates with the outer shoulder 124 and, if desirable, this ring 115 may be provided with the annular lip 116 which projects from the inner side face at the inner circumference thereof and will underlie the inner circumference of the adapter unit.

With this type of adapter unit there may be rights and lefts, because they are employed in pairs, in which case one adapter unit would be constructed as illustrated in Fig. 5 while the other would embody only the structural features shown in the adapter unit 18, Fig. 1, or both units of the pair may be include the channel 122 since said channel in the unit lying against the rim flange 14 probably will be covered and closed by the latter.

The assembling of the parts is similar to that previously set forth wherein the last mounted adapter unit, as 117, is telescoped over the rim and pushed beyond or past the groove 13 and the locking or retaining ring snapped into said groove. Then said adapter unit is slid outwardly or in a reverse direction until such adapter unit embraces the locking or retaining ring with the inner and outer shoulders 123 and 124, respectively, in engagement with the step 125 and the outer circumference or rim of the ring 115, respectively, and if said ring has a lip 116 it will be engaged by the inner circumference of the adapter unit. When the parts are in interengagement, as above outlined, the adapter unit in addition to being held in place by the ring also assists in holding said ring in position and houses it to prevent accidental contact with outside objects.

It will now be obvious that I have provided as exceedingly simple and relatively inexpensive adapter unit to be used in pairs and employed with standard wheel equipment to adapt a small size wheel rim for use with large size tires, such as those especially designed to be employed in connection with airplanes and known as airplane tires as well as truck tires of a large size relative to the wheel rim. This is particularly advantageous where a vehicle is employed to travel over certain types of ground surfaces and roadways and also when it is impossible to obtain the proper size tire for the wheel.

Of course I do not wish to be limited to the exact details of construction herein shown and described as these may be varied within the scope of the appended claims without departing from the spirit of the invention.

Having described my invention what I claim as new and useful is:

1. In means to mount a tire on a conventional truck wheel rim of smaller outside diameter than the inside diameter of the tire to be mounted thereon, said wheel rim including the usual flange at one side and the usual locking ring securing a second flange thereto at the other side, the combination with said wheel rim, holding flanges and locking ring of a pair of opposed annular adapters mounted on the rim at opposite sides thereof and having seat portions equal in thickness to one-half the difference between the aforesaid diameter of said rim and tire, at least one of said adapters being substituted for one of the wheel rim flanges and retained in place by said locking ring, said adapters each including an outwardly projecting radial flange at the outer side of the seat portion.

2. In means to mount a tire on a conventional truck wheel rim of smaller outside diameter than the inside diameter of the tire to be mounted thereon, said wheel rim including the usual tire holding flange at one side and the usual locking ring securing a second flange thereto at the other side, the combination with said tire rim, holding flanges and locking ring of a pair of opposed annular adapters mounted on the rim at opposite sides thereof and having seat portions equal in thickness to one-half the difference between the aforesaid diameters of said rim and tire, one of said adapters contacting the inner surface of the usual tire holding flange and the other adapter being substituted for the second flange and retained in place by said locking ring, said adapters each including an outwardly projecting radial flange at the outer side of the seat portion.

3. In means to mount a tire on a conventional truck wheel rim of smaller outside diameter than the inside diameter of the tire to be mounted thereon, said wheel rim including the usual flange at one side and the usual locking ring securing a second flange thereto and mounted in an annular groove at the other side, said locking ring having a laterally inwardly projecting lip, the combination with said wheel rim, holding flanges and locking ring of a pair of opposed annular adapters mounted on the rim at opposite sides thereof and having seat portions equal in thickness to one-half the difference between the aforesaid diameters of said rim and tire, one of said adapters contacting the inner surface of the wheel rim flange and the other adapter being substituted for the second flange and retained in place by said locking ring with the lip underlying a portion of said other adapter, said adapters each including an outwardly projecting radial flange at the outer side of the seat portion.

4. The structure according to claim 3 wherein the other adapter has an annular channel in its outer side face at the inner circumference thereof to receive and house portions of the locking ring.

5. The structure according to claim 3 wherein the other adapter has concentric offset shoulders provided by the formation of a stepped annular channel in the outer face at the inner circumference of said other adapter and the usual locking ring has an annular offset shoulder on its inner side surface for engagement with the annular shoulder of smaller diameter on said other adapter while the perimeter of said locking ring engages the shoulder of larger diameter on said other adapter.

6. The structure according to claim 3 wherein the tire engaging surface of the seat portion of each adapter is inclined inwardly away from the adapter flange.

7. The structure according to claim 3 wherein each of the adapters is split transversely whereby they may be readily slipped over the wheel rim from the outer side thereof, said adapters being contracted due to inflation of a tire thereon.

AGNES C. HOWLEY.

REFERENCES CITED

The following references are of record in the file of this patent:

UNITED STATES PATENTS

| Number | Name | Date |
|---|---|---|
| 1,043,208 | Dahl | Nov. 5, 1912 |
| 1,894,238 | Musselman | Jan. 10, 1933 |
| 1,961,095 | Baker et al. | May 29, 1934 |
| 2,537,624 | Brink | Jan. 9, 1951 |

FOREIGN PATENTS

| Number | Country | Date |
|---|---|---|
| 369,406 | Great Britain | Mar. 24, 1932 |